United States Patent [19]

Kennedy

[11] 4,135,493

[45] Jan. 23, 1979

[54] PARABOLIC TROUGH SOLAR ENERGY COLLECTOR ASSEMBLY

[75] Inventor: William S. Kennedy, San Jose, Calif.

[73] Assignee: Acurex Corporation, Mountain View, Calif.

[21] Appl. No.: 760,155

[22] Filed: Jan. 17, 1977

[51] Int. Cl.² .............................................. F24J 3/02
[52] U.S. Cl. ..................................... 126/271; 350/296
[58] Field of Search ............... 350/296, 293; 126/270, 126/271

[56] References Cited

U.S. PATENT DOCUMENTS

| 1,683,266 | 9/1928 | Shipman | 126/271 |
| 2,312,546 | 3/1943 | Hazard et al. | 244/123 |
| 2,330,185 | 9/1943 | Palmer | 244/123 |
| 2,872,915 | 2/1959 | Bowen | 126/271 |
| 2,906,257 | 9/1959 | Abbot | 126/271 |
| 2,945,234 | 7/1960 | Driscoll | 126/270 |
| 3,917,942 | 11/1975 | McCay | 126/270 |
| 3,959,056 | 5/1976 | Caplan | 126/271 |
| 3,996,917 | 12/1976 | Trihey | 126/270 |
| 4,000,734 | 1/1977 | Matlock et al. | 126/271 |

FOREIGN PATENT DOCUMENTS 485390  5/1938  United Kingdom .................... 350/293

Primary Examiner—Carroll B. Dority, Jr.

[57] ABSTRACT

A parabolic trough solar energy collector including an elongated support with a plurality of ribs secured thereto and extending outwardly therefrom. One surface of said ribs is shaped to define a parabola and is adapted to receive and support a thin reflecting sheet which forms a parabolic trough reflecting surface. One or more of said collectors are adapted to be joined end to end and supported for joint rotation to track the sun. A common drive system rotates the reflectors to track the sun; the reflector concentrates and focuses the energy along a focal line. The fluid to be heated is presented along the focal line in a suitable pipe which extends therealong.

10 Claims, 8 Drawing Figures

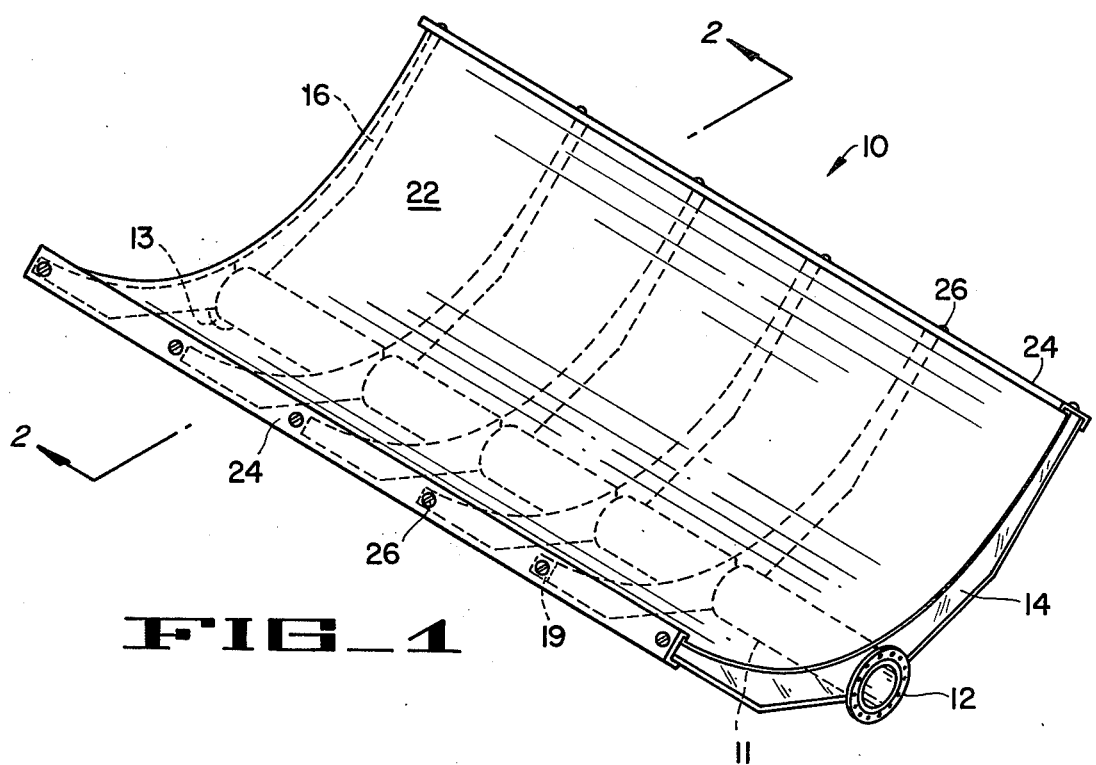
FIG_1
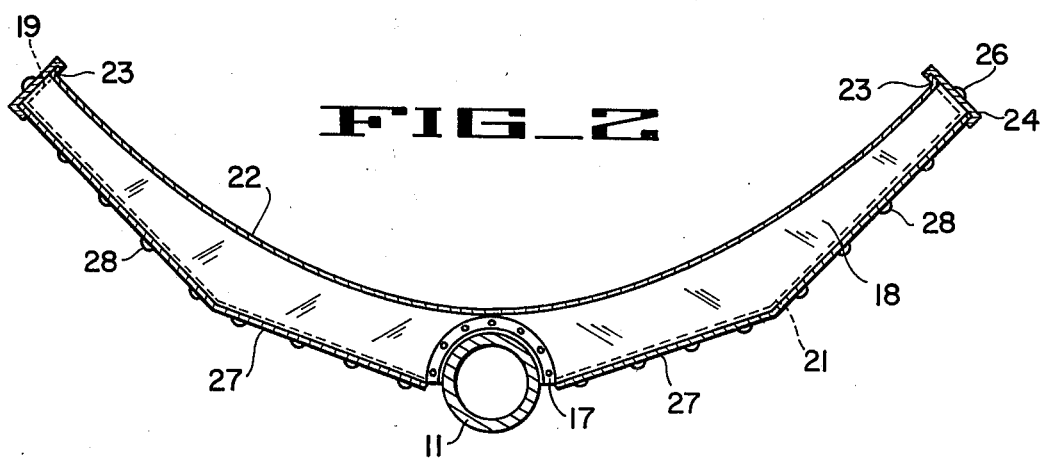
FIG_2
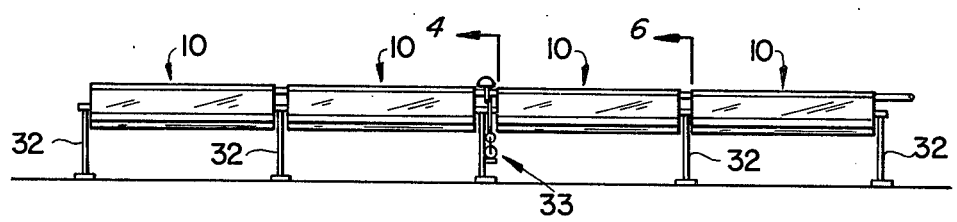
FIG_3

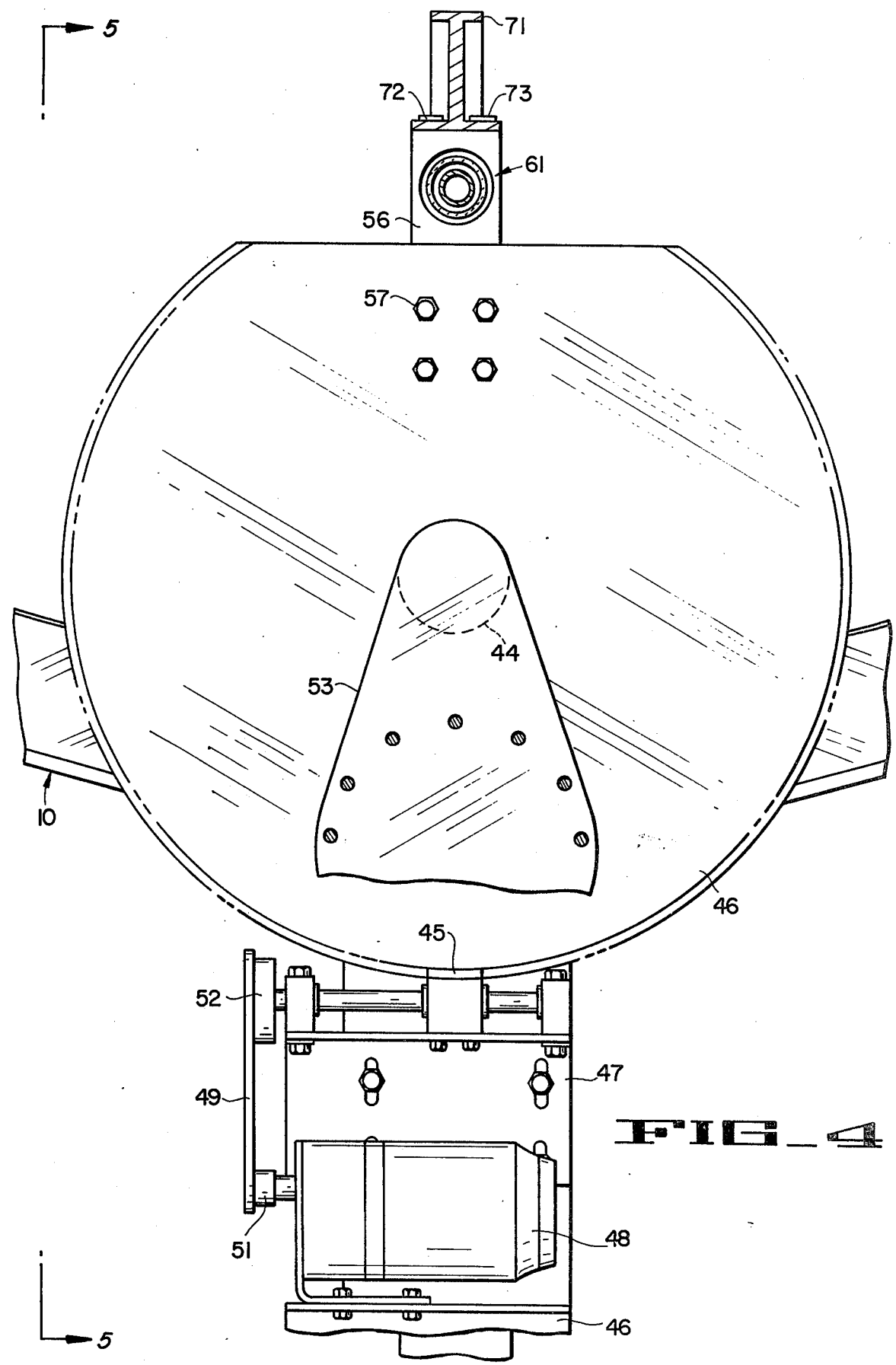

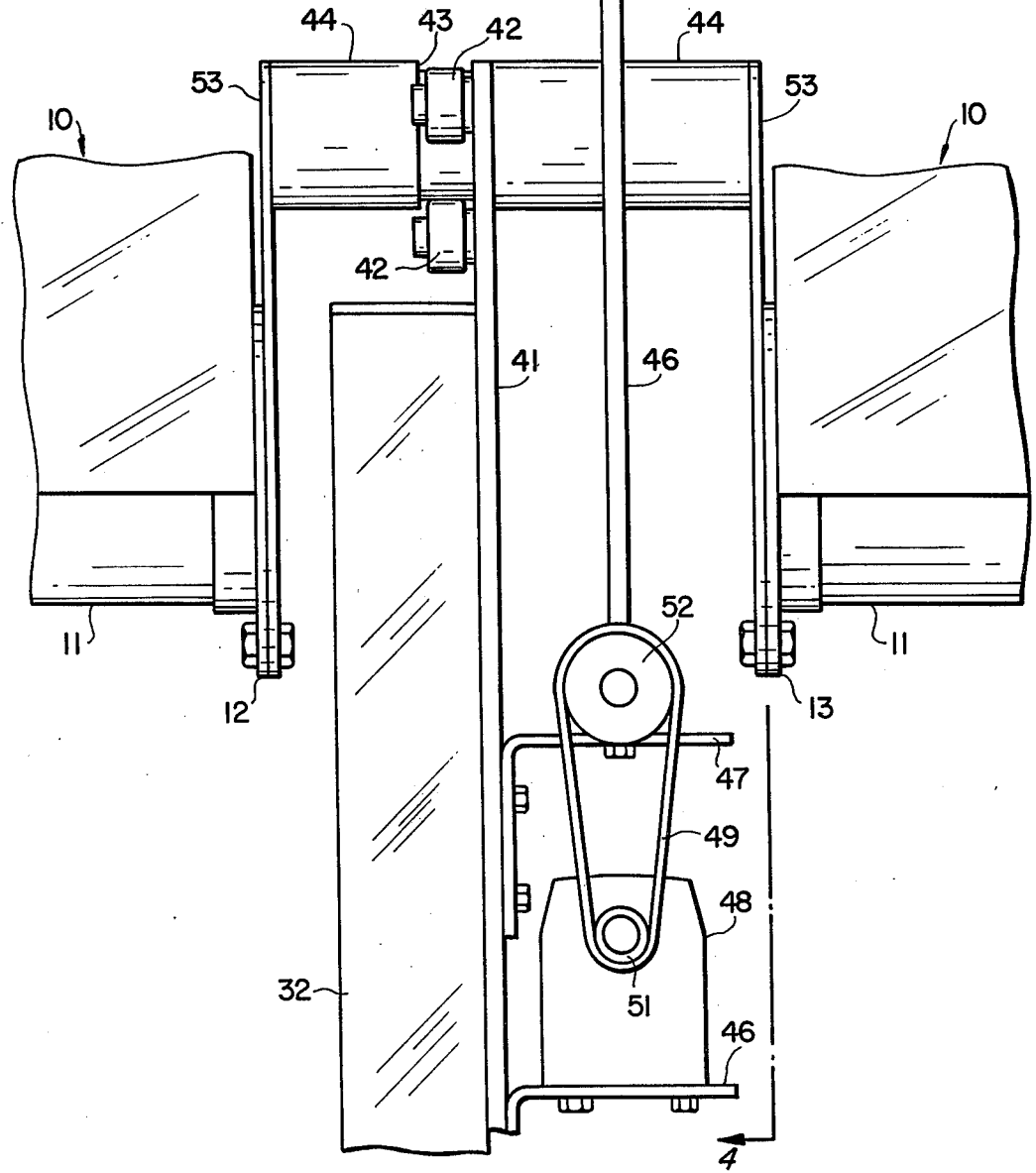
FIG_5

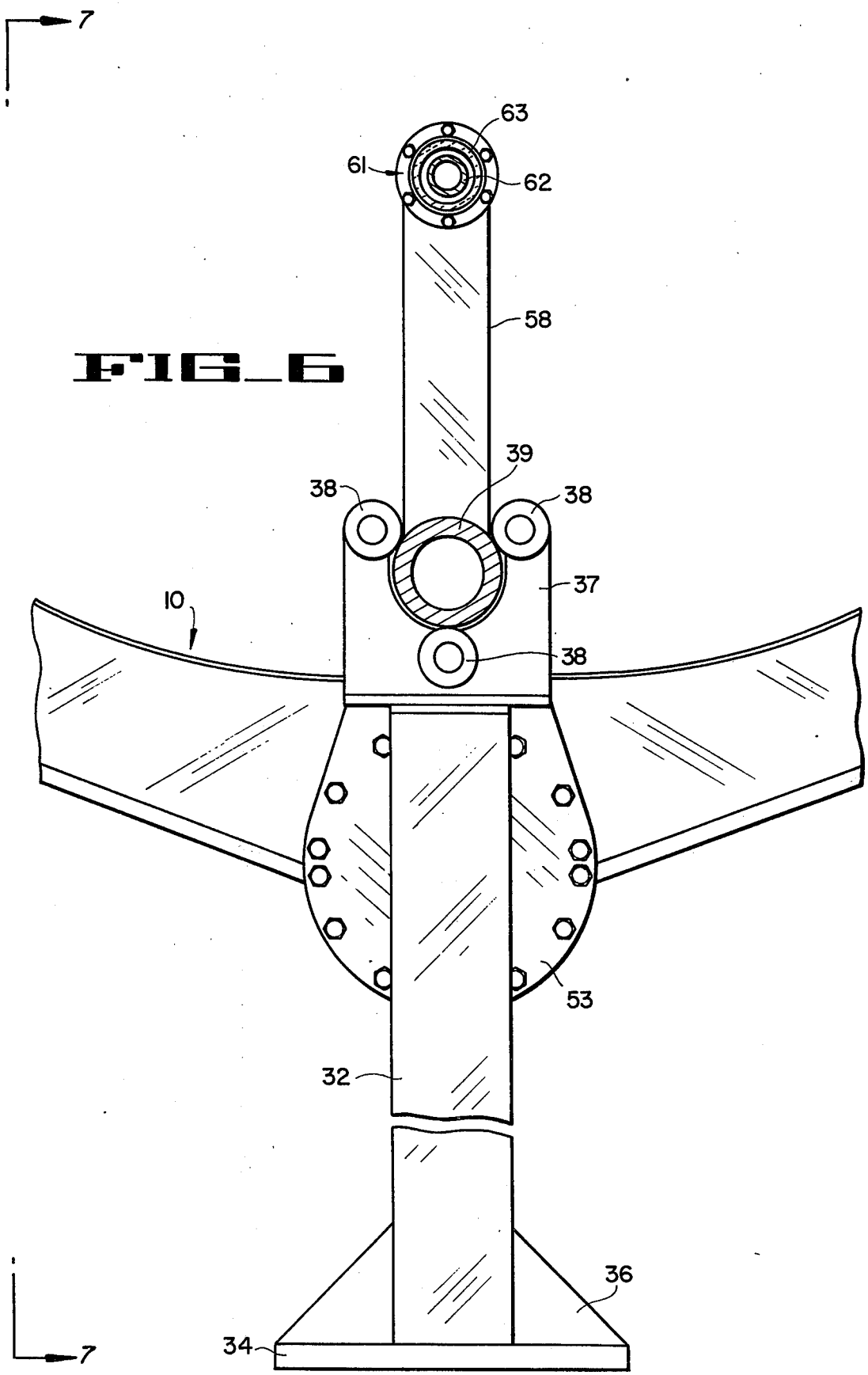

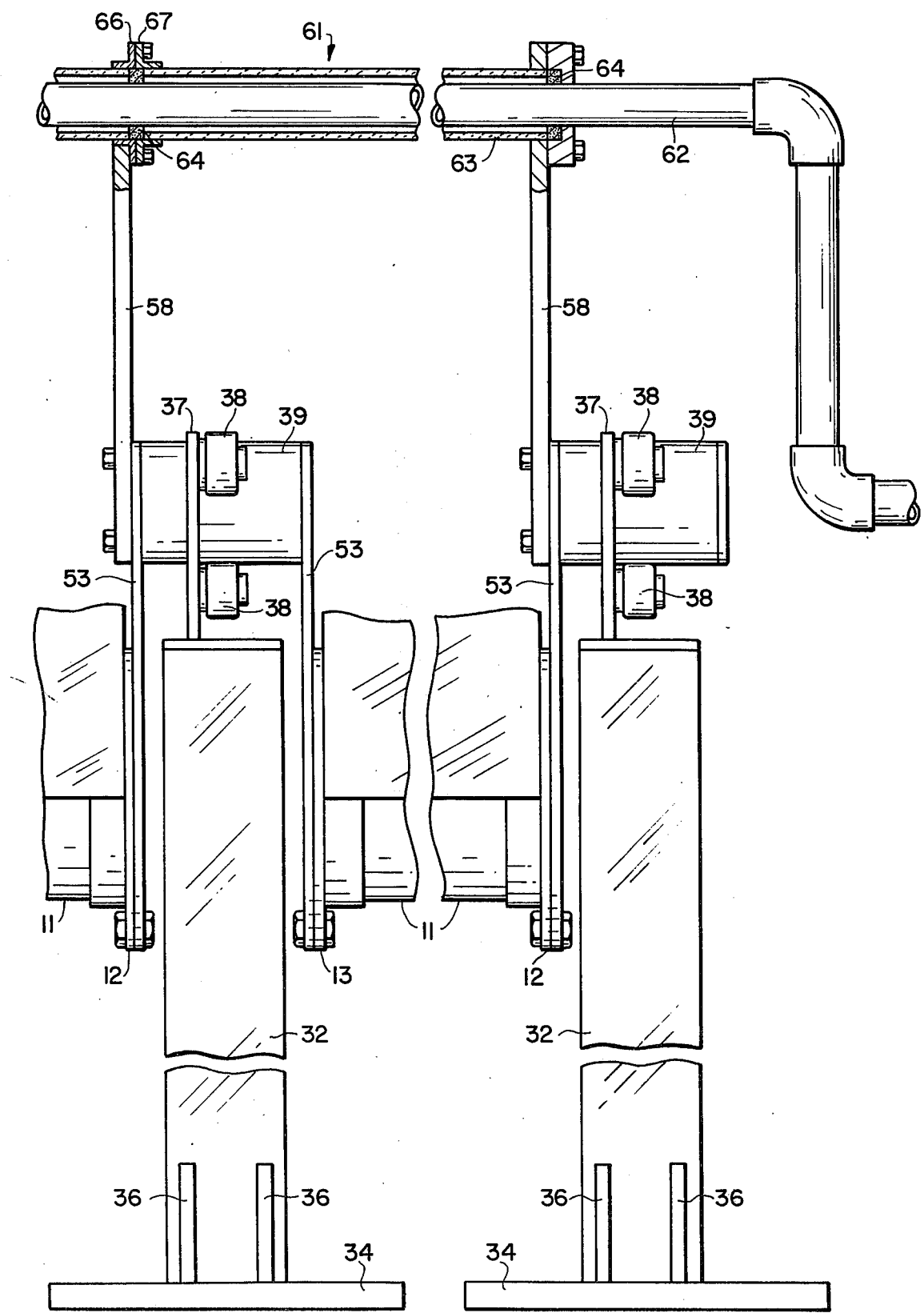

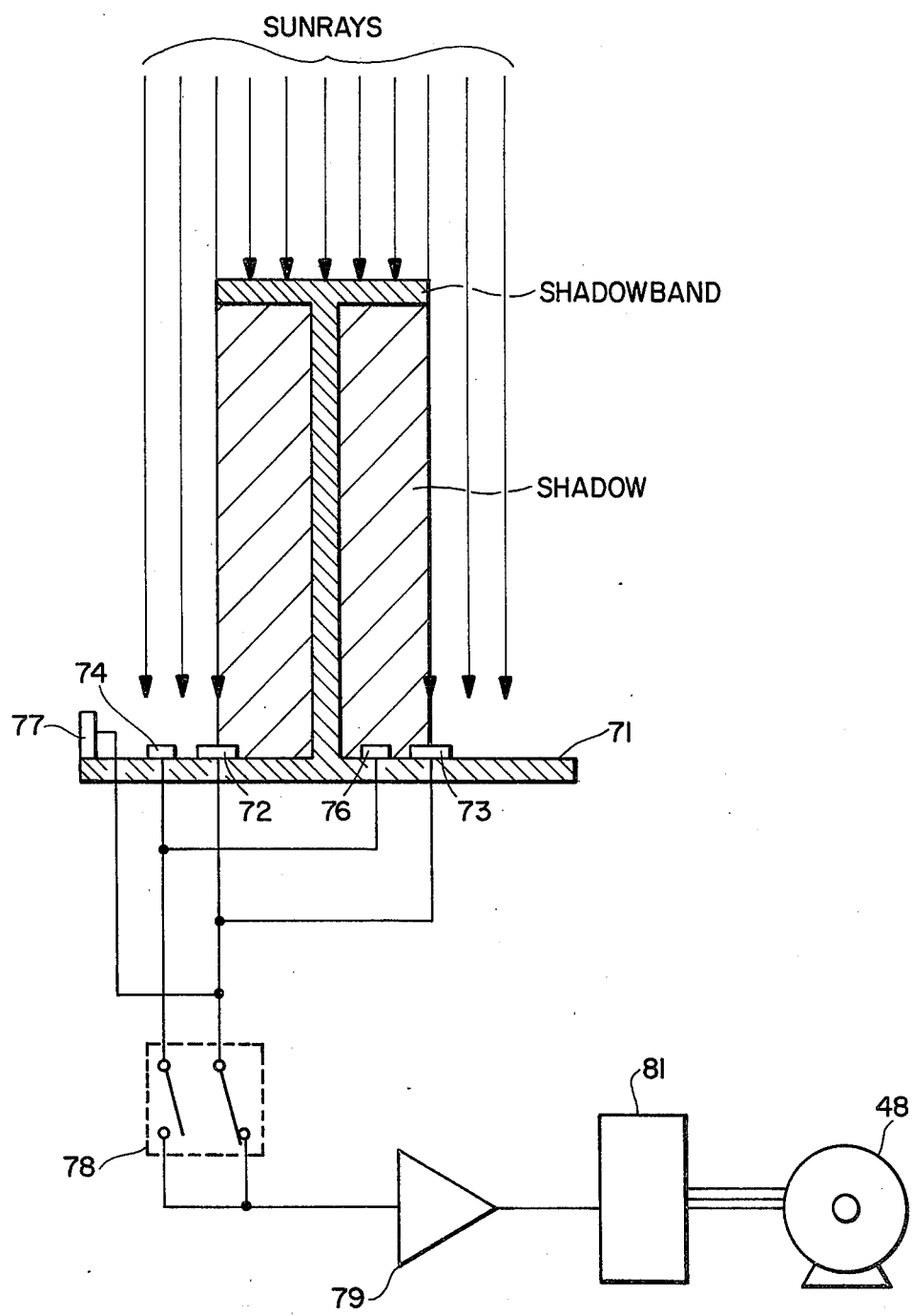
FIG_8

PARABOLIC TROUGH SOLAR ENERGY COLLECTOR ASSEMBLY

BACKGROUND OF THE INVENTION

This invention relates generally to parabolic trough solar energy collectors.

Solar energy collectors have long been known. They generally comprise concentrating and non-concentrating collectors. The former class includes flat plate collectors which operate at relatively low temperatures and do not concentrate the solar energy. The latter class includes various types of collectors which concentrate or focus solar energy onto a given area or line and are capable of operating at higher temperature. The latter type has included parabolic trough collectors of various configurations.

A drawback with the prior collectors is that they are not cost effective. The cost of the installation and of the reflector exceeds the savings realized by the utilization of solar energy as compared to the use of conventional fuel such as gas, oil or electricity. Furthermore, such reflectors have not been suitable for extended usage under the environmental conditions to which they are subjected for year-round operation. Furthermore, prior devices have been cumbersome to transport and expensive and difficult to erect at the site.

OBJECTS AND SUMMARY OF THE INVENTION

It is an object of the present invention to provide a cost effective parabolic trough solar energy collector.

It is another object of the present invention to provide a parabolic trough solar collector which is simple in construction and easy to erect at the site.

It is a further object of the present invention to provide a parabolic trough solar collector in which the reflecting surface has high predictable accuracy.

It is still another object of the present invention to provide a solar collector which is capable of mass production.

The foregoing and other objects are achieved by a solar reflector comprising an elongated rib support, a plurality of ribs formed of sheet material secured to and extending outwardly from said support with the upper edges of said ribs defining a parabolic trough surface, a thin reflecting sheet disposed to contact said edges of said ribs and to be supported thereby to form a parabolic trough reflection, retainer means cooperating with the edges of the reflective sheet serving to secure the sheet to the ribs and force the sheet against the upper edges thereof to conform the sheet to the parabolic surface, and means for presenting fluid to be heated along the focal line of said parabolic trough reflector.

BRIEF DESCRIPTION OF THE DRAWINGS

FIG. 1 is a perspective view of a parabolic trough reflector in accordance with the present invention.

FIG. 2 is a sectional view taken along the line 2—2 of FIG. 1 showing the support and support ribs and reflecting surface.

FIG. 3 is an elevational view of a plurality of reflectors of the type shown in FIGS. 1 and 2 supported and driven by a common drive.

FIG. 4 is a sectional view taken generally along the line 4—4 of FIG. 3 and line 4—4 of FIG. 5.

FIG. 5 is a sectional view taken along the line 5—5 of FIG. 4 showing the system for driving & tracking the sun.

FIG. 6 is an elevational view taken along the line 6—6 of FIG. 3 showing a typical support system.

FIG. 7 is an enlarged view taken generally along the line 7—7 of FIG. 6 and showing the support for the solar reflector system.

FIG. 8 is a schematic diagram of the solar tracking system employed in the present invention.

DETAILED DESCRIPTION OF PREFERRED EMBODIMENTS

Referring to FIGS. 1 and 2, there is shown a parabolic trough solar reflector 10 in accordance with the present invention. More particularly, the solar reflector includes an elongated rib support such as tube 11 which extends the length of the parabolic reflector. Support flanges 12 and 13 are secured to the ends of the support tube 11 and are adapted to receive the end ribs 14 and 16 which may be suitably attached to the flange by means of rivets or bolts. Disposed and spaced along the intermediate portion of the support tube 11 are a plurality of flanges 17, each of which is adapted to have secured thereto and extend outwardly therefrom intermediate ribs 18. Each of the ribs 14, 16 and 18 are identical in their construction and are made of thin sheet material, such as steel, with their end portions including a bent tab 19. The rib bottom includes a bend edge portion or lip 21. The upper edges of the ribs each define a parabola. A thin sheet of reflecting material 22 is placed to contact the upper edges of the thin ribs. The sheet 22 has its ends bent at right angles to form a lip such as shown at 23. Retainers 24 are suitably secured to the tabs 19 by means of screws, bolts or other suitable attachments 26 whereby the retainers are urged against the confronting face of the lips 23 to force the sheet 22 into intimate contact with the adjacent upper edges of the ribs. This causes the sheet to contour to the parabolic edges of the ribs and define a reflecting trough surface. Because of the thinness of the adjacent edge of the ribs, the thin sheet is in intimate contact and will be so maintained as long as there is pressure from the retainers. It is advantageous but not necessary to provide a cover such as the cover 27 which is suitably secured to lip portions 21 of the ribs by means of screws or bolts 28. This protects the back surface of the reflecting sheet and the ribs against the environment.

The advantage of the system just described is that the plurality of the ribs may be easily formed by stamping or machining in large quantities and then at the site attached to the flanges 17 to form the rib-like assembly for receiving the reflector sheet 22. It is apparent that the assembly is relatively light in construction and yet is rather sturdy because of the support provided by the elongated member 11 and the outwardly extending ribs having their ends secured to the retainer. The assembly is reinforced by the thin sheet 22 which prevents and minimizes shearing action. The trough reflector is relatively sturdy, much as the wings or fuselage of an airplane.

Referring to FIG. 3, there is shown a plurality of parabolic trough reflectors 10 supported by a plurality of posts 32. A central drive means 33 drives the plurality of reflectors in unison to track the sun. Referring more particularly to FIGS. 4-7, the support and drive system is illustrated in detail. The support system comprises posts 32 each having their bottom suitably secured to a plate 34. The plate may be attached to a concrete foundation element or other support. Brackets 36 may be provided to reinforce each of the posts. The upper end of each of the outer posts 32 supports a plate 37 which carries three spaced roller bearings 38 which engage a short hollow shaft 39. It is noted that the shafts 39 are free to move longitudinally with respect to the bearings 38. A support plate 41 is connected to the central post. The plate 41 includes roller bearings 42 which ride in the groove 43 formed in shaft 44. This prevents any longitudinal movement of the shaft with respect to its bearings. The arrangement of the outer support shafts 39 which are free to move in relation to their support bearings 38 provides means whereby thermal expansion of the system due to solar radiation is accommodated while maintaining the central drive portion in intimate relationship with its drive means.

The support plate 41 extends downwardly and receives motor and drive mounting brackets 46 and 47. Referring now more particularly to FIGS. 4 and 5, the drive means for driving the reflector is shown in more detail. The drive means includes a gear 46 driven by a worm gear 45. The worm gear is driven by reversible motor 48 via a belt or other suitable drive 49 which extends between the drive pulley 51 and pulley 52. The driven gear 46 is suitably attached to the shaft 44 whereby when the motor is energized, the shaft is driven by the driven gear 46.

The ends of the shafts 39 and 44 are provided with plates 53. The plates 53 are suitably attached to the ends of the shaft as by welding or screws. The plates extend downwardly to receive the end support flanges 12 and 13 of associated cylindrical supports 11. Thus, as the worm gear is driven, the support shaft 11 is rotated about an axis which corresponds to the axis of the shafts 39 and 44. The reflectors are moved to scan different portions of the sky. The opposite ends of the support tube 11 associated with the driven shaft 44 are connected to plates 53 which then cause the associated shaft 39 to rotate. The opposite ends of the shaft 39 accommodate similar plates 53 which are suitably attached to the flanges 11 and 12 of the ends of the associated supports 11. In this manner, a plurality of reflectors are supported and driven.

A support bracket 56 is secured to the driven gear. The bracket 56 is adapted to receive and support the fluid conduit assembly 61 which presents the fluid to the focal line of the parabolic trough reflector. The support 56 is suitably attached to the upper end of the gear as, for example, by means of studs 57. Each of the support shafts 39 includes supports 58 which extend upwardly and serve to receive the fluid conduit assembly 61.

The fluid conduit assembly 61 extends the length of the total reflector assembly and is supported by the supports 56 and 58. The conduit is disposed along the focal line of the parabolic trough reflectors. The conduit assembly 61 includes an inner conduit 62 which may be stainless steel coated with black paint or black chromium over a nickel plate. To minimize convective losses, a transparent jacket such as the Pyrex tube 63 surrounds or encloses the receiver or main tube 62. Since there may be a difference in thermal expansion between the tubes 62 and 63 made of different materials, the central tube 62 is continuous and supported by spaced insulating rings 64 disposed at each of the supports. The rings 64 are supported by cooperating flanges 66, 67 suitably attached to the ends of the supports. The insulating rings contact the adjacent ends of the ceramic or Pyrex outer tubing and permit it to expand longitudinally while it is supported by the flanges 66, 67. Thus, there is provision for differential expansion between the outer tube 63 and inner tube 62. Furthermore, it is to be observed that each of the tubes is supported in such a manner as to allow expansion of the assembly whereby the spacing between the supports varies.

The support 56 additionally supports a solar tracking means. The tracking means comprises shadow vane 71, a pair of main photocells 72 and 73, a pair of desteer photocells 74 and 76 and gross error photocell 77 connected via switch 78 to amplifier 79. The amplifier is connected to control a motor drive such as triac motor drive 81 which drives the reversible motor 48.

The main photocell pair are connected in opposition and give no output when they are equally illuminated whereby the reflector is tracking the sun and the reflectors provide energy to the fluid conducted in the receiver tube 62. The desteer photocells are switched into the system to steer the image of the sun off of the receiver tube during malfunction such as fluid pump failure. The gross error photocell is provided to reacquire the sun with gross alignment.

Thus, there has been provided an improved parabolic trough solar energy collector assembly which is simple in construction, easy to erect on site, and inexpensive to manufacture.

What is claimed is:

1. A solar energy collector comprising a collector assembly including a central elongated rib support, a plurality of spaced parallel ribs formed of sheet material secured to and extending outwardly in opposite directions from said rib support with the upper edges of said ribs defining an elongated parabolic surface, a thin sheet of reflecting material supported on the upper edge of said spaced ribs to conform to said parabolic surface to form a parabolic reflector for collecting solar energy and focusing the collected energy along a focal line, and retainer means cooperating between the ends of said ribs and adjacent edges of said sheet to hold the sheet in engagement with said ribs; support means for engaging said elongated rib support to support the collector assembly; and, means disposed at the focal line of said parabolic reflector to receive energy collected and reflected by said parabolic reflector.

2. A solar energy reflector comprising a collector assembly including an elongated rib support, a plurality of spaced parallel ribs formed of sheet material secured to and extending outwardly in opposite directions from said rib support with the upper edges of said ribs defining an elongated parabolic trough surface, a thin reflective sheet disposed to contact said edges of said ribs to be supported thereby and form a parabolic trough reflector for collecting solar energy and focusing it along a line, means cooperating with the edges of said reflective sheet serving to urge the sheet against the upper edges of the ribs to force the sheet against the upper edges thereof to conform the sheet to the parabolic surface; support means for engaging said elongated rib support to support the collector assembly; and, means for presenting fluid to be heated along the focal line of said parabolic trough reflector.

3. A solar reflector as in claim 2 in which said support means includes at least a pair of spaced supports, a pair of spaced shafts supported by said supports and means associated with said shafts for engaging said elongated rib support with its axis parallel to the axis of said shafts and spaced therefrom whereby when the shafts are rotated said rib support travels through a circle to cause the parabolic reflector to scan.

4. A solar reflector as in claim 3 including a motive means for driving one of said shafts to rotate the same, and solar tracking means associated with said motor serving to selectively energize the motor whereby the parabolic reflector tracks the sun to focus the sun rays onto said focal line.

5. A solar energy collector as in claim 4 wherein said solar tracking means includes a pair of photo cells and a shadow mask disposed between the same whereby the photo cells are equally illuminated when the sun is properly tracked and means connected to said photo cells for controlling said motor so that the solar reflector tracks the sun.

6. A solar collector system as in claim 5 including additionally a pair of desteer photo cells which are adapted to track the sun with the reflecting surface focused off of said fluid conduit.

7. A solar energy collector comprising an elongated rib support, a plurality of spaced ribs formed of stamped sheet material extending outwardly from said rib support with the upper edges thereof defining a surface, a thin sheet of reflecting material supported on said edge of said ribs to conform to said surface, means for holding said sheet of reflecting material in intimate contact with the upper edge of said ribs, means disposed to receive energy reflected by said sheet of reflecting material, and support means for engaging said rib support to support said collector.

8. A solar energy collector as in claim 5 wherein said means for presenting fluid to be heated along said focal line of the reflector comprises an inner elongated tubing having an outer heat absorbing surface and a concentric outer tubing being transparent to the solar energy for transmitting the energy to said tubing and to minimize convective losses from the inner elongated tube.

9. A solar reflector as in claim 8 wherein said concentric tubes include means serving to provide for a differential expansion between the same.

10. A solar energy collector including a plurality of in-line spaced supports, a plurality of spaced shafts rotatably carried in-line on said supports; a plurality of solar reflector assemblies each including an elongated rib support, ribs formed of sheet material secured to and extending outwardly therefrom with the upper edges of said ribs defining an elongated curved reflecting surface, and a reflective sheet in contact with the upper edges of said ribs to collect, reflect and concentrate solar energy; means carried at adjacent ends of pairs of said spaced shafts for engaging opposite ends of the elongated rib support of an associated reflector assembly to support in-line a plurality of reflector assemblies whereby when the shafts are rotated the reflector assemblies move in unison; and, means for presenting fluid to said solar collector to receive the concentrated solar energy from a plurality of in-line reflectors.

* * * * *